United States Patent
Akarapu et al.

(10) Patent No.: US 11,745,384 B2
(45) Date of Patent: Sep. 5, 2023

(54) MULTI-WALL THICKNESS, THIN-WALLED HONEYCOMB BODIES, AND EXTRUSION DIES AND METHODS THEREFOR

(71) Applicant: CORNING INCORPORATED, Corning, NY (US)

(72) Inventors: Ravindra Kumar Akarapu, Horseheads, NY (US); Amit Halder, Corning, NY (US); Priyank Paras Jain, Horseheads, NY (US); Weidong Li, Akron, OH (US)

(73) Assignee: Corning, Incorporated, Corning, NY (US)

( * ) Notice: Subject to any disclaimer, the term of this patent is extended or adjusted under 35 U.S.C. 154(b) by 329 days.

(21) Appl. No.: 16/954,250

(22) PCT Filed: Dec. 16, 2018

(86) PCT No.: PCT/US2018/065893
§ 371 (c)(1),
(2) Date: Jun. 16, 2020

(87) PCT Pub. No.: WO2019/125971
PCT Pub. Date: Jun. 27, 2019

(65) Prior Publication Data
US 2021/0362370 A1 Nov. 25, 2021

Related U.S. Application Data

(60) Provisional application No. 62/609,485, filed on Dec. 22, 2017, provisional application No. 62/609,477, filed on Dec. 22, 2017.

(51) Int. Cl.
*B28B 3/26* (2006.01)
*B29C 48/11* (2019.01)
(Continued)

(52) U.S. Cl.
CPC ............. *B28B 3/269* (2013.01); *B29C 48/022* (2019.02); *B29C 48/11* (2019.02); *B29C 48/30* (2019.02);
(Continued)

(58) Field of Classification Search
None
See application file for complete search history.

(56) References Cited

U.S. PATENT DOCUMENTS

| 3,885,977 A | 5/1975 | Lachman et al. |
| 4,233,351 A | 11/1980 | Okumura et al. |

(Continued)

FOREIGN PATENT DOCUMENTS

| EP | 0867223 A1 | 9/1998 |
| EP | 1138389 A1 | 10/2001 |

(Continued)

OTHER PUBLICATIONS

Ceramic Monolithic Substrates, https://dieselnet.com/tech/cat_substrate.php, Aug. 8, 2013 (Year: 2013).

(Continued)

*Primary Examiner* — Elizabeth Collister
(74) *Attorney, Agent, or Firm* — Joseph M. Homa

(57) ABSTRACT

A thin-walled honeycomb body (100) having a plurality of repeating cell structures (110) formed of intersecting porous thick walls (112V, 112H) and thin walls (114V, 114H). Each repeating cell structure (110) is bounded on its periphery by the thick walls (112V, 122H) of a first transverse thickness (Tk) and the thin walls (114V, 114H) have a second transverse thickness (Tt) that subdivides each repeating cell structure (110) into between 7 and 36 individual cells (108). In the thin-walled honeycomb body (100), the first transverse thickness (Tk) of the thick walls (112V, 112H) is less than or equal to 0.127 mm (0.005 inch) and the second
(Continued)

transverse thickness (Tt) of the thin walls (114V, 114H) is less than or equal to 0.0635 mm (0.0025 inch), and Tk>Tt. Honeycomb extrusion dies and methods of manufacturing the thin-walled honeycomb body (100) having thick walls (112V, 112H) and thin walls (114V, 114H) are provided.

20 Claims, 7 Drawing Sheets

(51) Int. Cl.
| | |
|---|---|
| *B29C 48/32* | (2019.01) |
| *B29C 48/30* | (2019.01) |
| *B29C 48/345* | (2019.01) |
| *B29C 48/00* | (2019.01) |
| *B01D 46/24* | (2006.01) |
| *B01D 53/94* | (2006.01) |
| *B01J 35/04* | (2006.01) |
| *B28B 3/20* | (2006.01) |
| *F01N 3/28* | (2006.01) |

(52) U.S. Cl.
CPC ............ *B29C 48/32* (2019.02); *B29C 48/345* (2019.02); *B01D 46/2418* (2013.01); *B01D 53/94* (2013.01); *B01D 2255/9155* (2013.01); *B01D 2279/30* (2013.01); *B01J 35/04* (2013.01); *B23H 2200/30* (2013.01); *B28B 2003/203* (2013.01); *F01N 3/2828* (2013.01); *F01N 2330/06* (2013.01); *F01N 2330/48* (2013.01)

(56) References Cited

U.S. PATENT DOCUMENTS

| | | |
|---|---|---|
| 4,521,532 A | 6/1985 | Cho |
| 4,550,005 A | 10/1985 | Kato |
| 5,332,703 A | 7/1994 | Hickman |
| 6,159,431 A | 12/2000 | Inoue et al. |
| 6,221,308 B1 | 4/2001 | Peng |
| 6,248,421 B1 | 6/2001 | Koike et al. |
| 6,259,078 B1 | 7/2001 | Araya |
| 6,299,813 B1 | 10/2001 | Brew et al. |
| 6,391,421 B1 | 5/2002 | Bruck et al. |
| 6,391,813 B1 | 5/2002 | Merkel |
| 6,541,407 B2 | 4/2003 | Beall et al. |
| 6,710,014 B2 | 3/2004 | Domesle et al. |
| 7,017,278 B2 | 3/2006 | Kato |
| 7,056,365 B2 | 6/2006 | Ichikawa et al. |
| 7,384,442 B2 | 6/2008 | Bardhan et al. |
| 7,413,717 B2 | 8/2008 | Hirai et al. |
| 7,429,416 B2 | 9/2008 | Hirakawa et al. |
| 7,504,146 B2 | 3/2009 | Ando et al. |
| 7,575,793 B2 | 8/2009 | Aniolek et al. |
| 7,596,885 B2 | 10/2009 | Adrian et al. |
| 7,803,447 B2 | 9/2010 | Kondo et al. |
| 7,846,526 B2 | 12/2010 | Kunieda |
| 7,989,047 B2 | 8/2011 | Segawa et al. |
| 8,038,757 B2 | 10/2011 | Bardon et al. |
| 8,974,724 B2 | 3/2015 | Day et al. |
| 9,005,517 B2 | 4/2015 | Bronfenbrenner et al. |
| 9,038,284 B2 | 5/2015 | Feldman et al. |
| 9,335,093 B2 | 5/2016 | Feldman et al. |
| 9,446,560 B2 | 9/2016 | Bronfenbrenner et al. |
| 9,452,578 B2 | 9/2016 | Bronfenbrenner et al. |
| 2003/0165662 A1 | 9/2003 | Suwabe et al. |
| 2004/0123573 A1 | 7/2004 | Ichikawa et al. |
| 2004/0142145 A1 | 7/2004 | Hashimoto et al. |
| 2005/0107244 A1 | 5/2005 | Ichikawa et al. |
| 2006/0177629 A1 | 8/2006 | Kunieda |
| 2006/0240212 A1 | 10/2006 | Masukawa et al. |
| 2007/0231533 A1 | 10/2007 | Aniolek et al. |
| 2007/0231537 A1 | 10/2007 | Hirakawa et al. |
| 2009/0011181 A1 | 1/2009 | Mizuno et al. |
| 2011/0206896 A1 | 8/2011 | Humphrey et al. |
| 2012/0045973 A1 | 2/2012 | Folmar et al. |
| 2012/0270010 A1 | 10/2012 | Hiratsuka |
| 2015/0071829 A1 | 3/2015 | Oya |
| 2017/0197170 A1 | 7/2017 | Beall et al. |

FOREIGN PATENT DOCUMENTS

| | | |
|---|---|---|
| EP | 1537914 A1 | 6/2005 |
| EP | 1685899 A1 | 8/2006 |
| EP | 1739288 A1 | 1/2007 |
| EP | 1839724 A2 | 10/2007 |
| EP | 2246107 A1 | 11/2010 |
| EP | 2500079 A1 | 9/2012 |
| JP | 54-110189 U | 8/1979 |
| JP | 58-019743 A | 2/1983 |
| JP | 2004-261623 A | 9/2004 |
| JP | 2007-273537 A | 10/2007 |
| JP | 2007-289924 A | 11/2007 |
| JP | 2009-190964 A | 8/2009 |
| JP | 4709002 B2 | 6/2011 |
| JP | 2011-194357 A | 10/2011 |
| JP | 2011-194359 A | 10/2011 |
| JP | 2012-192390 A | 10/2012 |
| JP | 5049337 B2 | 10/2012 |
| JP | 2013-202531 A | 10/2013 |
| JP | 5343996 B2 | 11/2013 |
| WO | 2006/108110 A1 | 10/2006 |
| WO | 2007/119498 A1 | 10/2007 |
| WO | 2008/066765 A1 | 6/2008 |
| WO | 2009/017642 A1 | 2/2009 |
| WO | 2013/175552 A1 | 11/2013 |
| WO | 2014/046912 A1 | 3/2014 |
| WO | 2016/014495 A1 | 1/2016 |

OTHER PUBLICATIONS

Hirose et al., machine translation of JP 2011-194357, Oct. 6, 2011 (Year: 2011).

International Search Report and Written Opinion of the International Searching Authority; PCT/US2018/065893; dated Mar. 21, 2019; 16 Pages; European Patent Office.

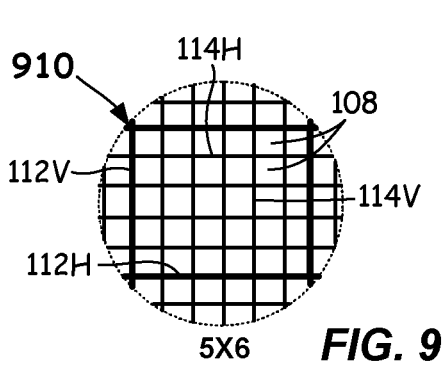
FIG. 9
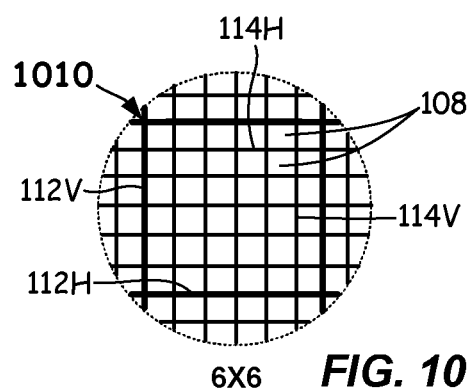
FIG. 10
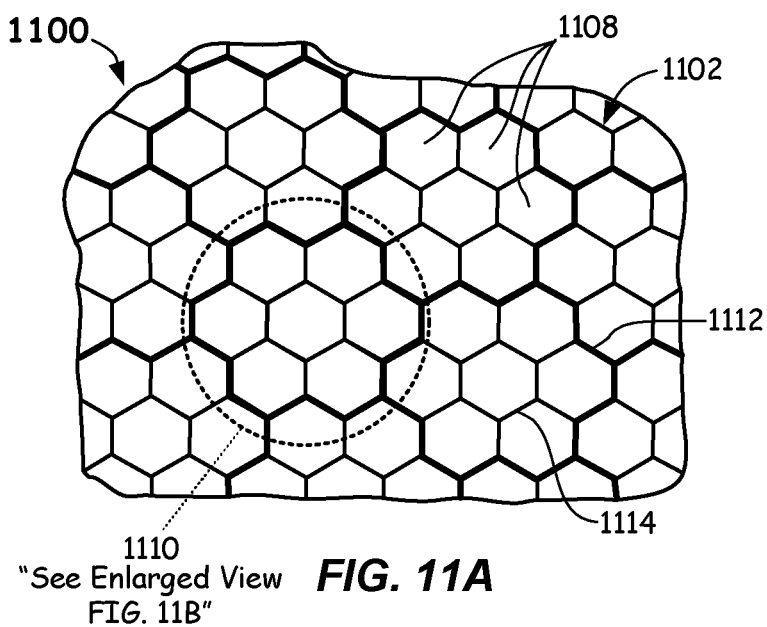
FIG. 11A
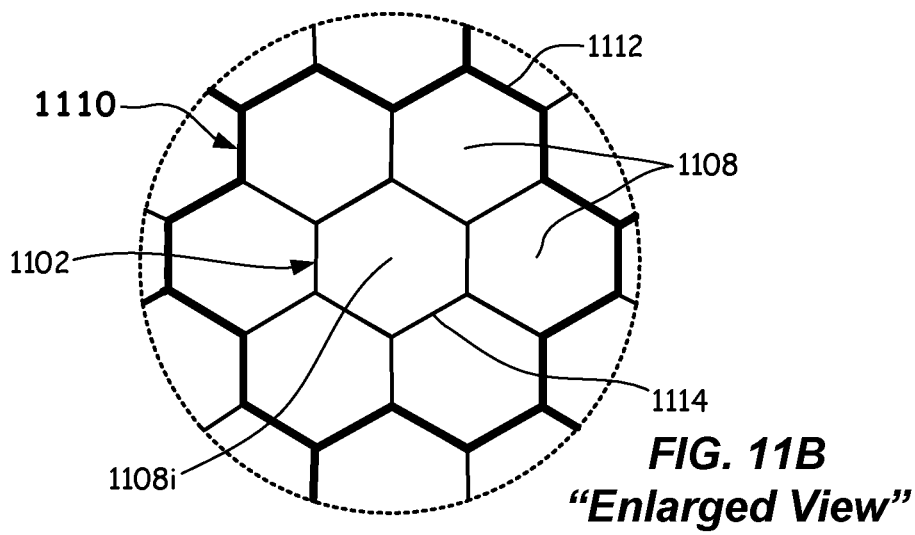
FIG. 11B "Enlarged View"

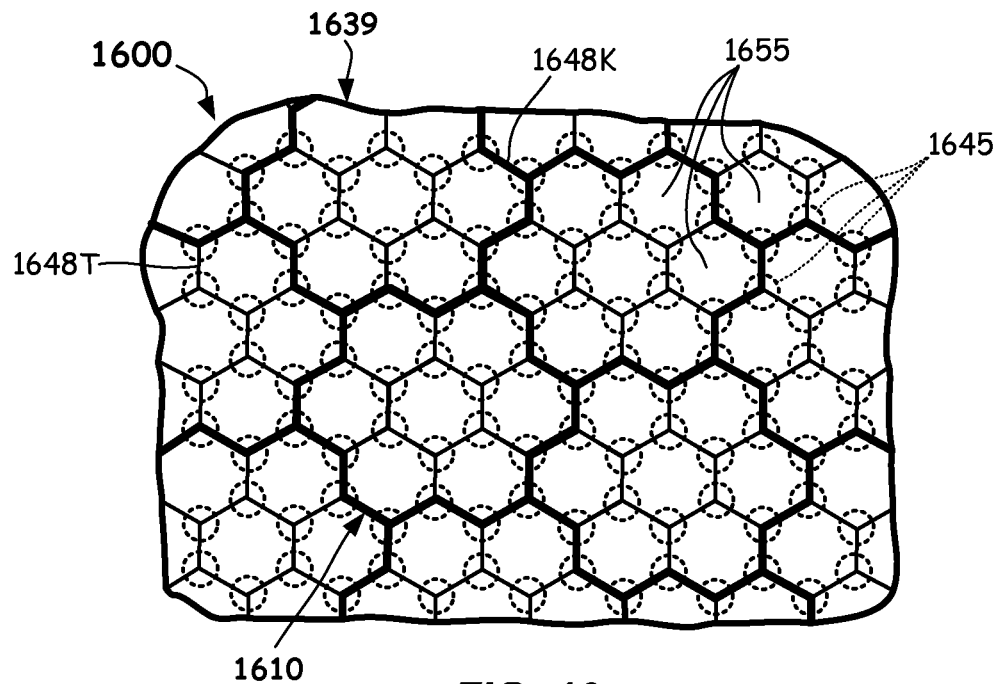

Providing a honeycomb extrusion die comprising an outlet face forming a plurality of repeating pin structures defining intersecting thick slots of a first slot thickness (Sk) and thin slots of a second slot thickness (St), wherein (i) each repeating pin structure is bounded on a periphery by the thick slots, (ii) each repeating pin structure is subdivided into between 7 and 36 individual pins by the thin slots, and (iii) the first slot thickness (Sk) is less than or equal to 0.0056 inch (0.142 mm) and the second slot thickness (St) is less than or equal to 0.0028 inch (0.0711 mm) — 1702

Extruding a ceramic-forming material through the honeycomb extrusion die to produce the thin-walled honeycomb body — 1704

FIG. 17

MULTI-WALL THICKNESS, THIN-WALLED HONEYCOMB BODIES, AND EXTRUSION DIES AND METHODS THEREFOR

CROSS-REFERENCE TO RELATED APPLICATIONS

This application is a National Stage application under 35 U.S.C. § 371 of International Application No. PCT/US2018/065893 filed on Dec. 16, 2018 which claims the benefit of priority under 35 U.S.C. § 119 to U.S. Provisional Application Ser. No. 62/609,485 filed on Dec. 22, 2017 and to U.S. Provisional Application Ser. No. 62/609,477, filed Dec. 22, 2017, the contents of which are relied upon and incorporated herein by reference in their entireties.

FIELD

Embodiments of the disclosure relate to honeycomb bodies, and more particularly to honeycomb bodies used as catalyst supports in engine exhaust systems.

BACKGROUND

Catalytic converters include a honeycomb body having a plurality of intersecting porous walls forming co-parallel, axially-extending cells. Various cells of the honeycomb body may act as a catalyst support and may be coated with a catalyst-containing wash coating, wherein the catalyst may be a noble metal. Once coated, the coated honeycomb body may be received in a can or other suitable housing. Collectively, the catalyzed honeycomb body and can are referred to as a "catalytic converter" herein. In standard configurations, certain combinations of thin walls and cell densities have been included in honeycomb bodies. For example, cell densities in currently available thin-walled honeycomb bodies have configurations with cell density (cells per square inch or cpsi)/wall thickness (mil) of 400/6, 350/5.5, 400/4, 400/3, 600/4, 600/3, 600/2.8, 750/2.8, 900/2.8. Over time, there has been a progression towards having thinner walls and higher cell densities because fast light-off is desired to reduce startup emissions and to provide more surface area for catalyst application.

SUMMARY

Illustrative embodiments of the present disclosure are directed to thin-walled honeycomb bodies, extrusion dies for forming the thin-walled honeycomb bodies, and methods of manufacture of the thin-walled honeycomb bodies. In one embodiment, a thin-walled honeycomb body comprises a plurality of cells provided by a matrix of intersecting porous walls forming a plurality of repeating cell structures, wherein (i) each repeating cell structure comprises "thick" walls of a first transverse thickness (Tk) and "thin" walls of a second transverse thickness (Tt) such that Tk>Tt, (ii) each repeating cell structure is subdivided into between 7 and 36 individual cells by thin walls, (iii) each repeating cell structure is bound on a periphery by thick walls, (iv) the thin walls interconnect with the thick walls and with each other, (v) the first transverse thickness (Tk) of the thick walls is less than or equal to 0.005 inch (0.127 mm), and (vi) the second transverse thickness (Tt) of the thin walls is less than or equal to 0.0025 inch (0.0635 mm) and less than the first transverse thickness (Tk).

In some embodiments, the first transverse thickness (Tk) of the thick walls is less than or equal to 0.004 inch (0.102 mm).

In some embodiments, the second transverse thickness (Tt) of the thin walls is less than or equal to 0.002 inch (0.0508 mm).

In some embodiments, the second transverse thickness (Tt) of the thin walls is less than or equal to 0.0015 inch (0.038 mm).

In some embodiments, the thin-walled honeycomb body comprises a cell density of greater than or equal to 600 cpsi.

In some embodiments, the thin-walled honeycomb body comprises a cell density of greater than or equal to 750 cpsi.

In some embodiments, the thin-walled honeycomb body comprises a cell density of greater than or equal to 900 cpsi.

In some embodiments, each repeating cell structure comprises an R×C configuration of 3×3, 3×4, 3×5, 3×6, 4×4, 4×5, 4×6, 5×5, 5×6, or 6×6, wherein R is a number of rows and C is a number of columns of the individual cells in each repeating cell structure.

In some embodiments, the thin-walled honeycomb body comprises a cell density of greater than or equal to 900 cpsi, the first transverse thickness (Tk) of the thick walls is less than or equal to 0.004 inch (0.102 mm), and the second transverse thickness (Tt) of the thin walls is less than or equal to 0.0015 inch (0.0381 mm).

In some embodiments, each repeating cell structure has a 3×3 configuration and each of the individual cells in the repeating cell structure has a rectangular perimeter shape in transverse cross-section.

In some embodiments, each repeating cell structure has a 4×4 configuration and each of the individual cells in the repeating cell structure has a rectangular perimeter shape in transverse cross-section.

In some embodiments, each repeating cell structure has a 5×5 configuration and each of the individual cells in the repeating cell structure has a rectangular perimeter shape in transverse cross-section.

In some embodiments, each repeating cell structure has a 6×6 configuration and each of the individual cells in the repeating cell structure has a rectangular perimeter shape in transverse cross-section.

In some embodiments, the periphery of each repeating cell structure is rectangular in transverse cross-section.

In some embodiments, the periphery of each repeating cell structure is square in transverse cross-section.

In some embodiments, the individual cells of each repeating cell structure have a hexagonal perimeter shape in transverse cross-section.

In some embodiments, each repeating cell structure comprises an interior hexagonal cell surrounded by peripheral hexagonal cells.

In some embodiments, each repeating cell structure comprises a ring of peripheral hexagonal cells.

In some embodiments, the thin-walled honeycomb body comprises an average wall thickness of less than or equal to 0.003 inch (0.0762 mm).

In some embodiments, the thin-walled honeycomb body comprises an average wall thickness of less than or equal to 0.0025 inch (0.0635 mm).

In some embodiments, the thin-walled honeycomb body comprises an average wall thickness of less than or equal to 0.0020 inch (0.0508 mm).

In some embodiments, the thin-walled honeycomb body comprises Tk−Tt≥0.0025 inch (0.0635 mm).

In some embodiments, the thin-walled honeycomb body comprises Tk−Tt≥0.0030 inch (0.0762 mm).

In some embodiments, the thin-walled honeycomb body comprises Tk−Tt≥0.0035 inch (0.0889 mm).

In some embodiments, the thin-walled honeycomb body comprises 0.0025 inch (0.0635 mm)≤Tk−Tt≤0.0035 inch (0.0889 mm).

In some embodiments, the thin-walled honeycomb body comprises a 900/4/1.5/4×4 configuration.

In some embodiments, the thin-walled honeycomb body comprises a 750/4/1.5/4×4 configuration.

In some embodiments, each repeating cell structure comprises a cell structure with a R×C configuration, wherein R is a number of rows and C is a number of columns of individual cells in the repeating cell structure, wherein R is between 3 and 6, and C is between 3 and 6.

Various embodiments of the present disclosure are directed to a thin-walled honeycomb body comprising: a plurality of cells provided by a matrix of intersecting porous walls forming a plurality of repeating cell structures, wherein (i) the repeating cell structures are distributed throughout the thin-walled honeycomb body, (ii) each repeating cell structure comprises thick walls of a first transverse thickness (Tk) of less than or equal to 0.005 inch (0.127 mm) and thin walls of a second transverse thickness (Tt) of less than or equal to 0.0025 inch (0.0635 mm), (iii) each repeating cell structure is bounded on a periphery by thick walls, (iv) each repeating cell structure is subdivided into between 7 and 36 individual cells by the thin walls, (v) the thin walls interconnect with the thick walls and with each other, and (vi) each repeating cell structure has a R×C configuration, wherein: R is between 3 and 6, C is between 3 and 6, and wherein R is a number of rows and C is a number of columns of the individual cells in each repeating cell structure.

Further embodiments of the present disclosure are directed to a honeycomb extrusion die, comprising: a die body comprising an outlet face forming a plurality of repeating pin structures defining intersecting thick slots of a first slot thickness (Sk) and thin slots of a second slot thickness (St), wherein (i) each repeating pin structure is bounded on a periphery by the thick slots, (ii) each repeating pin structure is subdivided into between 7 and 36 individual pins by the thin slots, (iii) the thin slots interconnect with the thick slots and with each other, and (iv) the first slot thickness (Sk) is less than or equal to 0.0056 inch (0.142 mm) and the second slot thickness (St) is less than or equal to 0.0028 inch (0.0711 mm).

Embodiments of the present disclosure are also directed to a method of manufacturing a thin-walled honeycomb body, comprising: providing a honeycomb extrusion die comprising an outlet face forming a plurality of repeating pin structures defining intersecting thick slots of a first slot thickness (Sk) and thin slots of a second slot thickness (St), wherein (i) each repeating pin structure is bounded on a periphery by the thick slots, (ii) each repeating pin structure is subdivided into between 7 and 36 individual pins by the thin slots, and (iii) the first slot thickness (Sk) is less than or equal to 0.0056 inch (0.142 mm) and the second slot thickness (St) is less than or equal to 0.0028 inch (0.0711 mm); and extruding a ceramic-forming material through the honeycomb extrusion die to produce the thin-walled honeycomb body.

In some embodiments, the method comprises firing the green honeycomb body to produce the thin-walled honeycomb body having a first transverse thickness (Tk) of thick walls less than or equal to 0.005 inch (0.127 mm) and a second transverse thickness (Tt) of thin walls less than or equal to 0.0025 inch (0.0635 mm), wherein the thick walls are thicker than the thin walls.

Yet further embodiments are directed to a honeycomb body comprising a honeycomb structure comprising a plurality of cells provided by a matrix of intersecting porous walls, wherein (i) the matrix comprises a repeating pattern of a plurality of closed cell blocks, (ii) each closed cell block comprises a plurality of thin interior walls bounded by a plurality of thick peripheral walls, (iii) each closed cell block comprises a plurality of first cells bounded by a subset of the thin interior walls and not bounded by any of the thick peripheral walls, (iv) each closed cell block further comprises a plurality of second cells bounded by both a second subset of the thin interior walls and a subset of the thick peripheral walls, and (v) at least two directly adjacent closed cell blocks share at least one thick peripheral wall.

In some embodiments, each of the plurality of first cells comprises a periphery with the same shape as its respective closed cell block.

Numerous other features and aspects are provided in accordance with these and other embodiments of the disclosure. Further features and aspects of embodiments will become more fully apparent from the following detailed description, the claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

FIG. 9 illustrates an alternative 5×6 R×C configuration of the repeating cell structure according to one or more embodiments.

FIG. 10 illustrates an alternative 6×6 R×C configuration of the repeating cell structure according to one or more embodiments.

FIG. 11A illustrates partial inlet side view of a thin-walled honeycomb body comprising an alternative configuration of a plurality of repeating cell structures comprising hexagonal cell structure and having 7 individual cells in the repeating cell structure with a ring of peripheral hexagonal cells according to one or more embodiments.

FIG. 11B illustrates an enlarged view of the configuration of the repeating cell structure comprising hexagonal cells and particularly comprising a ring of hexagonal cells according to one or more embodiments.

FIG. 16 illustrates a partial view of an outlet face of an extrusion die illustrating a plurality of repeating pin structures of hexagonal individual pins and feedhole locations according to one or more embodiments.

FIG. 17 illustrates a flowchart depicting a method of manufacturing a honeycomb body comprising a plurality of repeating cell structures with thick walls and thin walls according to one or more embodiments.

DETAILED DESCRIPTION

Figure 1A:
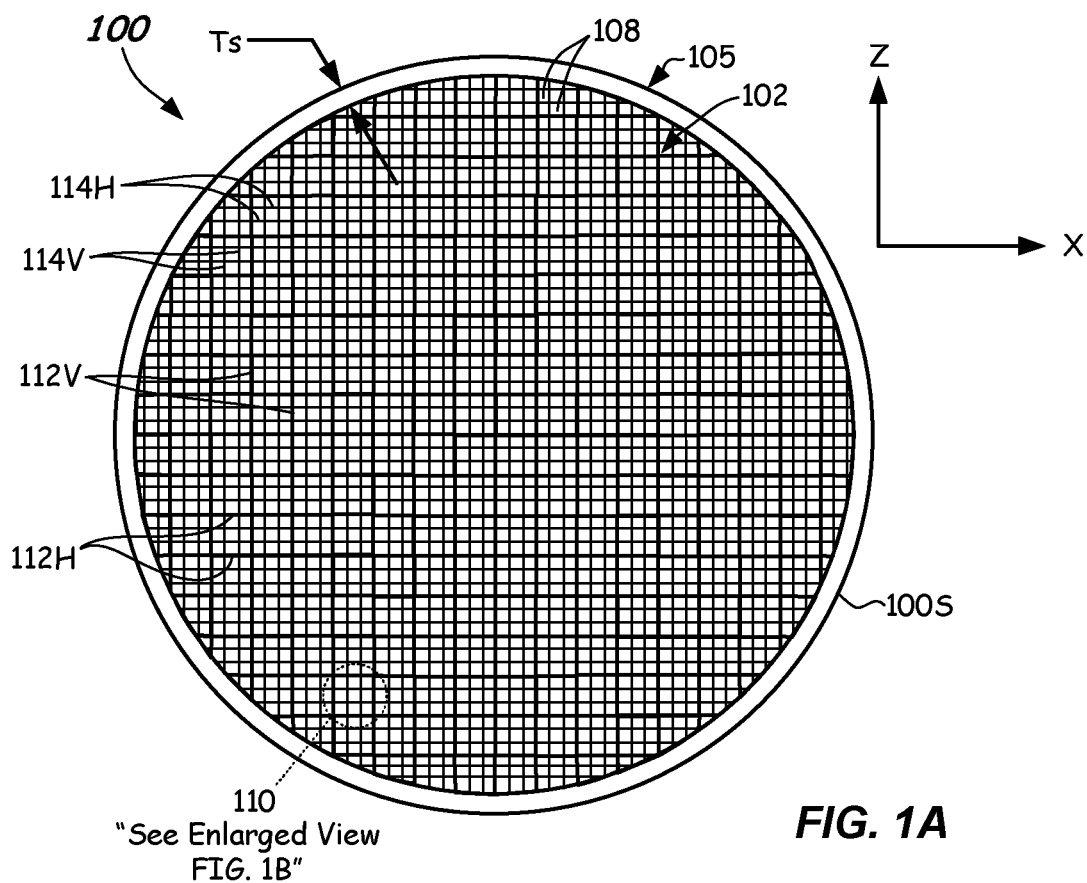
FIG. 1A illustrates an inlet side view of a thin-walled honeycomb body comprising a plurality of repeating cell structures having thick walls and thin walls according to one or more embodiments.

Reference will now be made in detail to the example embodiments of this disclosure, which are illustrated in the accompanying drawings. In describing the embodiments, numerous specific details are set forth in order to provide a thorough understanding of the disclosure. However, it will be apparent to a person of ordinary skill in the art that embodiments of the invention may be practiced without some or all of these specific details. In other instances, well-known structural or functional features and/or process steps have not been described in detail so as not to unnecessarily obscure embodiments of the invention. Structural and functional features of the various embodiments described herein may be combined with each other, unless specifically noted otherwise.

In view of the problems of the prior art, embodiments of this disclosure relate to a thin-walled honeycomb body. A thin-walled honeycomb body may be configured for use in a catalytic converter, that is, it may be a substrate for deposit of a washcoat comprising one or more metals, such as platinum, palladium, rhodium, combinations, or the like. These one or more metals catalyze a reaction with the exhaust stream, such as of an exhaust stream from an internal combustion engine exhaust (e.g., automotive engine or diesel engine). Other metals may be added such as nickel and manganese to block sulfur absorption by the washcoat. The reaction may oxidize carbon monoxide and oxygen into carbon dioxide, for example. Moreover, modern three-way catalysts may also reduce oxides of nitrogen (NOx) to nitrogen and oxygen. Additionally, unburnt hydrocarbons may be oxidized to carbon dioxide and water.

The thin-walled honeycomb bodies may be made of an intersecting matrix of thin webs of a suitable porous material (e.g., porous ceramic). The catalytic material(s) may be suspended in a washcoat of inorganic particulates and a liquid vehicle and applied to the walls of thin-walled honeycomb body, such as by coating. Thereafter, the coated thin-walled honeycomb body may be wrapped with a cushioning material and received in a can (or housing) via a canning process.

As part of this canning process, the thin-walled honeycomb body may be subjected to appreciable isostatic compression stresses. In thin-walled honeycomb bodies having wall thicknesses of all the walls of 0.006 inch or less, and especially in "ultra-thin" walled honeycomb bodies having wall thickness of all the walls of 0.003 inch or less, these isostatic stresses can, in some cases, cause fracture of the porous walls thereof. The predominant mechanism of fracture has been determined by the inventors to be buckling and/or significant deformation of the walls. Thus, thin-walled honeycomb designs that enable higher isostatic strength and therefore less buckling may provide certain advantages, in terms of less wall fracture during canning (and handling).

Therefore, in accordance with embodiments of the disclosure, thin-walled honeycomb bodies comprising buckling-resistant configurations are provided. The buckling-resistant configurations are particularly beneficial for application in thin-walled honeycomb bodies (including ultra-thin walled honeycomb bodies). Moreover, some embodiments of the thin-walled honeycomb body configurations of the disclosure may be readily manufactured using relatively low-cost die manufacturing technologies, such as wire electrical discharge machining (EDM).

In accordance with one or more embodiments of the disclosure, a buckling-resistant thin-walled honeycomb body is provided with increased isostatic strength. The isostatic strength may be increased by as much as 20% or more, 25% or more, or even 30% or more than the isostatic strength of comparable conventional constant wall thickness thin-walled honeycomb body designs.

Such improved honeycomb bodies may result in fewer canning failures from canning pressures and isostatic stress. This may be due to the higher isostatic strength of these thin-walled configurations, but also because various embodiments of such thin-walled honeycomb body configurations are more defect tolerant.

In one or more embodiments, the thin-walled honeycomb body comprises a plurality of cells provided by a matrix of intersecting porous walls forming a plurality of repeating cell structures that are arranged in a repeating pattern. Each of the repeating cell structures of the thin-walled honeycomb body comprised of thick walls and thin walls. It is to be understood that the terms "thick" and "thin" are used herein relative to each other for each embodiment, i.e., the "thick" walls in a given honeycomb body are thicker than the "thin" walls for that given honeycomb body. The thick walls bound the periphery of the repeating cell structures and the thin walls may be made less than 0.0025 inch (0.0635 mm). Thus, thin honeycomb walls may provide improved fast light-off properties. Further, combination of thin walls and high cell densities of greater than or equal to 750 cpsi (or even 900 cpsi) may be provided with suitable isostatic strength.

The thicker peripheral walls of each repeating cell unit enhance isostatic strength while the interior walls can be made thinner to allow for higher cell density and fast light-off. Further descriptions of embodiments of thin-walled honeycomb bodies, catalytic converters, exhaust systems including thin-walled honeycomb bodies, extrusion dies for forming the thin-walled honeycomb bodies, and methods of manufacture of the thin-walled honeycomb bodies are provided with reference to FIGS. 1A-17 herein.

Figure 1B:
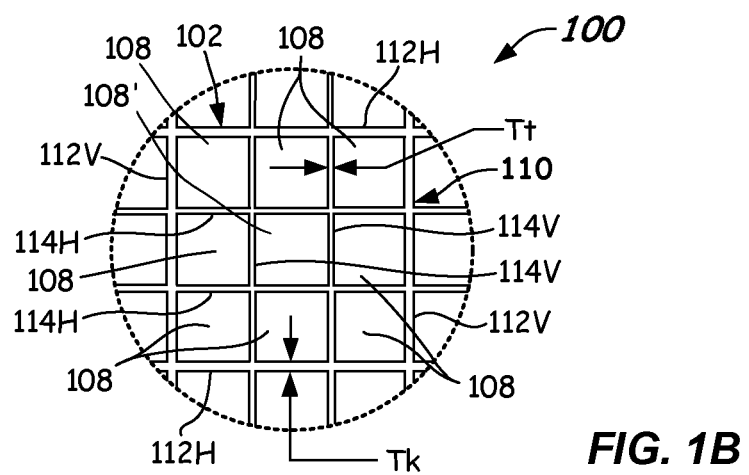
FIG. 1B illustrates an enlarged, partial, inlet-side end view of a repeating cell structure of the thin-walled honeycomb body of FIG. 1A illustrating a 3×3 R×C configuration with thick walls bounding the repeating cell structure according to one or more embodiments.

FIGS. 1A-1B illustrate an inlet end plan view and an enlarged partial view, respectively, of a first example embodiment of a thin-walled honeycomb body 100 (hereinafter "honeycomb body") comprising a plurality of repeating cell structures 110. The honeycomb body 100 has utility for use as a catalyst substrate, which is used as a vehicle emissions control device that converts toxic byproducts of combustion to less toxic substances by performing catalyzed chemical reactions with a flow stream, such as an engine exhaust stream of an internal combustion engine (e.g., gas or diesel engine). The honeycomb body 100 may be coated with an inorganic washcoat, which may comprise titanium dioxide, aluminum oxide, silicon dioxide, or combinations thereof, for example. Catalytic materials (e.g., as described above) can be suspended in the washcoat before application to the honeycomb body 100. For example, the catalytic materials may be one or more metals, such as platinum, palladium, rhodium, or combinations thereof. Further, some washcoat compositions may also comprise cerium, iron, nickel, and manganese. Other washcoat compositions may be used.

The depicted embodiment of honeycomb body 100 for FIGS. 1A and 1B comprises a plurality of cells 108 provided by a matrix of intersecting porous 102 walls forming a plurality of repeating cell structures 110, arranged in a repeating pattern. The pattern may be repeated across the honeycomb body 100 and extend out to the skin 105. The porous walls 102 in this embodiment, intersect with one another (e.g., at right angles) and form a plurality of cells 108 that extend longitudinally (e.g., substantially parallel with one another) to define a plurality of channels, and that extend along an axial flow axis extending from an inlet end to an outlet end of the honeycomb body 100.

The repeating cell structures 110 are bounded on an outer periphery by thick walls, which are arranged in the rectangular orientation shown as vertical thick walls 112V and horizontal thick walls 112H, wherein the horizontal thick walls 112H and vertical thick walls 112V are oriented perpendicularly to and intersect with one another. It is to be understood that the terms "vertical" and "horizontal" are used herein to facilitate discussion with respect to the orientation of the drawings, but should not be considered limiting to any particular direction. The thick walls 112H, 112V may extend in a straight line across a width and a height (as shown) of the honeycomb body 100 and their ends may intersect with the skin 105.

Thin walls 114H, 114V subdivide the repeating cell structure 110 into a plurality of cells 108. In particular, the thin walls 114H, 114V subdivide the repeating cell structure 110 into between 7 and 36 individual cells 108. The thin walls 114H, 114V interconnect with the thick walls 112H, 112V and with each other, as shown. Each of the cells 108 within the repeating cell structure 110 may have a rectangular cell shape in transverse cross section. The inventors herein have discovered that if the number of cells (and thus thin walls 114H, 114V) in the repeating cell structure 110 is too low (e.g., fewer than 7), then fast light-off performance can suffer. Contrarily, if the number of cells 108 in the repeating cell structure 110 is too high (e.g., more than 36) then the isostatic strength of the honeycomb body suffers. Moreover, open frontal area may be too low, impacting back pressure.

Thus, to exhibit combinations of fast light-off and also good isostatic strength, the thick walls 112A, 112B may have a first transverse thickness Tk and the thin walls 114H, 114V may have a second transverse thickness Tt. The first transverse thickness Tk of the thin walls 114H, 114V is greater than the second transverse thickness Tt of the thick walls 112A, 112B. In some embodiments, the first transverse thickness Tk of the thick walls 112H, 112V is less than or equal to 0.127 mm (0.005 inch). In some embodiments, the second transverse thickness Tt of the thin walls 114H, 114V is less than or equal to 0.0635 mm (0.0025 inch). In some embodiments, the vertical thick walls 112V and the horizontal thick walls 112H are of the same thickness, but they need not be. Likewise, in some embodiments, the vertical thin walls 114V and the horizontal thick walls 112H are of the same thickness, but they need not be.

In some embodiments, the first transverse thickness Tk of the thick walls 112H, 112V may be less than or equal to 0.004 inch (0.102 mm). Moreover, in some embodiments, the second transverse thickness Tt of the thin walls 114H, 114V may be less than or equal to 0.0020 inch (0.0508 mm), or even less than or equal to 0.0015 inch (0.0381 mm). The transverse cross-sectional area of each cell 108 of the repeating cell structure 110 may be constant along an entire length of the cell 108. Moreover, transverse wall thicknesses Tk and Tt of the porous walls 102 may each be constant along an axial length (Y—perpendicular to X and Z) of the porous walls 102. Moreover, the transverse wall thicknesses Tk and Tt of the porous walls 102 may be constant along horizontal (X) and vertical (Z) directions of the porous walls 102.

Furthermore, the thin-walled honeycomb body 100 can comprise a cell density of greater than or equal to 600 cpsi. However, in other embodiments, the cell density may be greater than or equal to 750 cpsi, or even greater than or equal to 900 cpsi. In one example embodiment, the cell density is greater than or equal to 900 cpsi, the first transverse thickness Tk of the thick walls 112H, 112V is less than or equal to 0.004 inch (0.102 mm), and the second transverse thickness Tt of the thin walls 114H, 114V is less than or equal to 0.0015 inch (0.0381 mm).

As stated above, the thin walls 114H, 114V subdivide the repeating cell structure 110 into between 7 and 36 individual cells 108. The cell structure 110 may be arranged in an R×C (or "R by C") configuration having R number of rows and C number of columns. In other words, an R×C configuration for the cell structure 110 arranges the cells 108 in a grid or pattern of R rows by C columns. The cell structures 110 may be referred to as a block of the cells 108, i.e., as cell blocks 110. The subdivision by the thin walls 114H, 114V can provide the repeating cell structure 110 shown in FIGS. 1A and 1B, which is a 3×3 R×C repeating cell structure 110 having 3 cells arranged along the horizontal Row (R) direction in the X-direction and 3 cells arranged along a vertical column (C) in the Z-dimension, for a total of 9 individual cells 108. In particular, the repeating cell structure 110 if the FIGS. 1A-1B embodiment has a 3×3 R×C configuration and each of the individual cells 108 in the repeating cell structure 110 has a rectangular perimeter shape (e.g., a square shape) in transverse cross-section. The 3×3 R×C configuration is bounded by thick walls 112H, 112V.

In some embodiments, the plurality of repeating cell structures described herein comprises a repeating pattern of a plurality of closed cell blocks 110. Each cell block 110 comprises a plurality of thin interior walls 114H, 114V bounded by a plurality of thick peripheral walls 112H, 112V. Each cell block comprises a plurality of first cells bounded by a subset of the thin interior walls 114H, 114V and not bounded by any of the thick peripheral walls 112H, 112V. For example, in FIG. 1B, a single one of the individual cell 108 at the center of the 3×3 configuration, labeled with a prime symbol as cell 108', is bounded by a subset of the thin interior walls 114H, 114V and not bounded by any of the thick peripheral walls 112H, 112V. Each cell block 110 further comprises a plurality of second cells bounded by both a second subset of the thin interior walls 114H, 114V and a subset of the thick peripheral walls 112H, 112V. For example, in FIG. 1B, the eight individual cells 108 (labeled without the prime symbol ') at the periphery of the 3×3 configuration are bounded by both a second subset of the thin interior walls 114H, 114V and a subset of the thick peripheral walls 112H, 112V. At least two directly adjacent closed cell blocks share at least one thick peripheral wall 112H, 112V. In some embodiments, each of the plurality of first cells comprises a periphery with the same shape as its respective closed cell block.

An alternative embodiment of a thin-walled honeycomb body 200 is shown and described with reference to FIG. 2. The thin-walled honeycomb body 200 (only a portion is drawn) comprises a plurality of repeating cell structures 210, which has an R×C configuration that is a 4×4 configuration as shown, and each of the individual cells 108 (a few labeled) in the repeating cell structure 210 has a rectangular perimeter shape (e.g., square shape) in transverse cross-section. As in the previous embodiment, horizontal thin walls 114H and vertical thin walls 114V subdivide the repeating cell structure 210 into the R×C configuration, and the outer periphery of the repeating cell structure 210 is bounded by horizontal thick walls 112H and vertical thick walls 112V arranged as a rectangle.

Further examples of R×C repeating cell structures 310, 410, 510, 610, 710, 810, 910, and 1010 comprising a rectangular outer periphery are shown in FIGS. 3-10, respectively. Each of these repeating cell structures 310-1010 may be used and repeated across the honeycomb body in the same manner as the R×C repeating cell structures 110, 210 shown in FIGS. 1A-2. In particular, repeating cell structures 110-1010 comprising an R×C configuration of 3×3 (9 individual cells), 3×4 (12 individual cells), 3×5 (15 individual cells), 3×6 (18 individual cells), 4×4 (16 individual cells), 4×5 (20 individual cells), 4×6 (24 individual cells), 5×5 (25 individual cells), 5×6 (30 individual cells), and 6×6 (36 individual cells) are shown and described in FIG. 1A-10. In each embodiment described herein, the first transverse thickness Tk of the thick walls (e.g., thick walls 112H, 112V) is greater than the second transverse thickness Tt of the thin walls (e.g., thin walls 114H, 114V).

Figure 3:
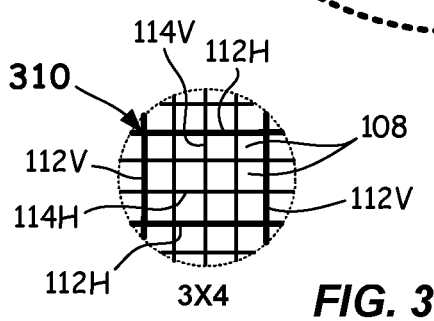
FIG. 3 illustrates an alternative 3×4 R×C configuration of the repeating cell structure according to one or more embodiments.

In particular, FIG. 3 illustrates an R×C configuration of a repeating cell structure 310 having a 3×4 configuration wherein each of the individual cells 108 (a few of which are labeled) in the repeating cell structure 310 has a rectangular outer perimeter shape (e.g., square or rectangular non-square shape) in transverse cross-section. The repeating cell structure 310 is bounded by thick walls 112H, 112V arranged as a rectangle. In some embodiments herein, the number of horizontal rows (R) may be less than or equal to the number of vertical columns (C), i.e. R≤C.

Figure 4:
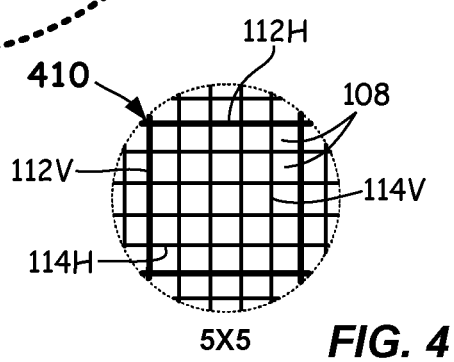
FIG. 4 illustrates an alternative 5×5 R×C configuration of the repeating cell structure according to one or more embodiments.

Likewise, shown in FIG. 4 is a R×C configuration of a repeating cell structure 410 having a 5×5 configuration. Each of the individual cells 108 in the repeating cell structure 410 has an outer periphery that is rectangular (e.g., square or rectangular non-square) in transverse cross-section. The repeating cell structure 410 is bounded by thick walls 112H, 112V arranged as a rectangle.

Figure 5:
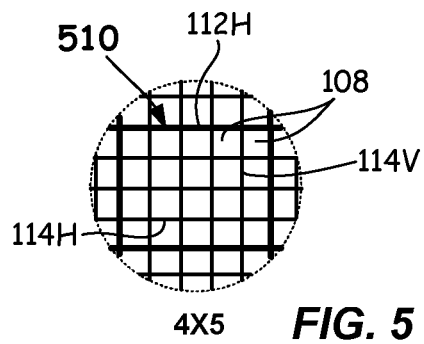
FIG. 5 illustrates an alternative 4×5 R×C configuration of the repeating cell structure according to one or more embodiments.

Similarly, as shown in FIG. 5, an R×C repeating cell structure 510 having a 4×5 configuration is provided. Each of the individual cells 108 in the repeating cell structure 510 has a periphery of the repeating cell structure 510 that is rectangular (e.g., square or rectangular non-square) in transverse cross-section. The repeating cell structure 510 is bounded by thick walls 112H, 112V arranged as a rectangle.

Figure 6:
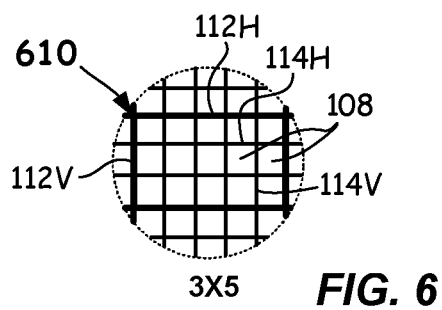
FIG. 6 illustrates an alternative 3×5 R×C configuration of the repeating cell structure according to one or more embodiments.

In another embodiment, as shown in FIG. 6, an R×C repeating cell structure 610 having a 3×5 configuration is provided. Each of the individual cells 108 in the repeating cell structure 610 has a periphery of the repeating cell structure 610 that is rectangular (e.g., square or rectangular non-square) in transverse cross-section. The repeating cell structure 610 is bounded by thick walls 112H, 112V arranged as a rectangle.

Figure 7:
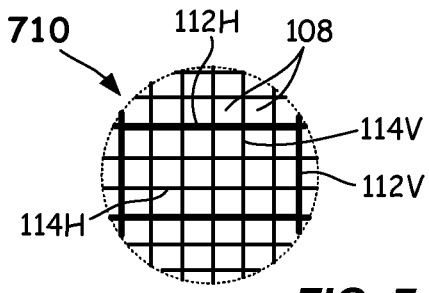
FIG. 7 illustrates an alternative 3×6 R×C configuration of the repeating cell structure according to one or more embodiments.

In yet another embodiment, as shown in FIG. 7, an R×C repeating cell structure 710 having a 3×6 configuration is provided. Each of the individual cells 108 in the repeating cell structure 710 has a periphery of the repeating cell structure 710 that is rectangular (e.g., square or rectangular non-square) in transverse cross-section. The repeating cell structure 710 is bounded by thick walls 112H, 112V arranged as a rectangle.

Figure 8:
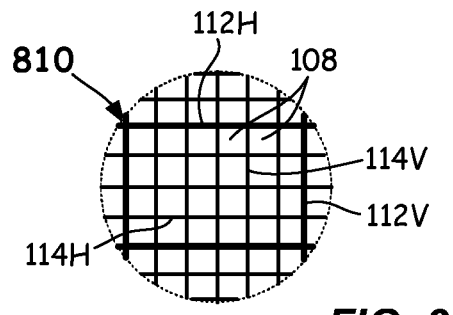
FIG. 8 illustrates an alternative 4×6 R×C configuration of the repeating cell structure according to one or more embodiments.

In another embodiment, as shown in FIG. 8, an R×C repeating cell structure 810 having a 4×6 configuration is provided. Each of the individual cells 108 in the repeating cell structure 810 has a periphery of the repeating cell structure 810 that is rectangular (e.g., square or rectangular non-square) in transverse cross-section. The repeating cell structure 810 is bounded by thick walls 112H, 112V arranged as a rectangle.

In another embodiment, as shown in FIG. 9, an R×C repeating cell structure 910 having a 5×6 configuration is provided. Each of the individual cells 108 in the repeating cell structure 910 has a periphery of the repeating cell structure 910 that is rectangular (e.g., square or rectangular non-square) in transverse cross-section. The repeating cell structure 910 is bounded by thick walls 112H, 112V arranged as a rectangle.

In another embodiment, as shown in FIG. 10, an R×C repeating cell structure 1010 having a 6×6 configuration is provided. Each of the individual cells 108 in the repeating cell structure 1010 has a periphery of the repeating cell structure 1010 that is rectangular (e.g., square or rectangular non-square) in transverse cross-section. The repeating cell structure 1010 is bounded by thick walls 112H, 112V arranged as a rectangle.

FIGS. 11A-11B illustrate another embodiment of a honeycomb body 1100 (only a portion shown) comprising a plurality of repeating cell structures 1110 therein. In this embodiment, each repeating cell structure 1110 comprises individual cells 1108 having a hexagonal perimeter shape in transverse cross section. In the embodiment shown, 7 individual cells 1108 are grouped to provide the repeating cell structure 1110 bounded by thick walls 1112. In the depicted embodiment, an interior hexagonal cell 1108i is shown surrounded by a ring of peripheral hexagonal cells 1108. Thin walls 1114 subdivide the repeating cell structure 1110 into the 7 individual cells 1108, including the interior hexagonal cell 1108i.

Figure 12:
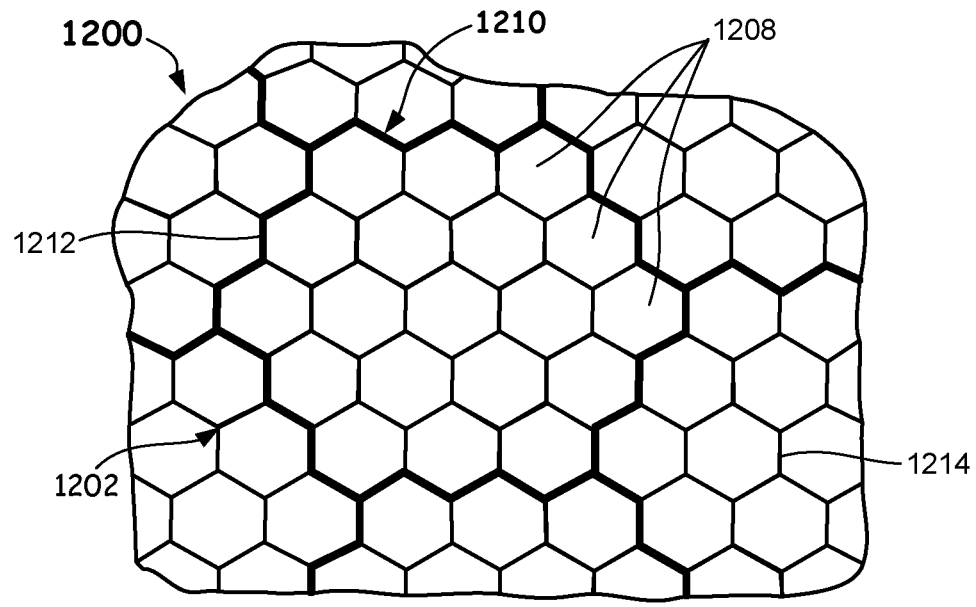
FIG. 12 illustrates a partial inlet side view of a thin-walled honeycomb body comprising an alternative configuration of a plurality of repeating cell structures comprising a ring of hexagonal cells bounded by a thick wall according to one or more embodiments.

FIG. 12 illustrates another embodiment of a honeycomb body 1200 (only a portion shown) including a repeating cell structure 1210 provided therein. In this embodiment, the repeating cell structure 1210 also comprises individual cells 1208 having a hexagonal perimeter shape in transverse cross section. In the embodiment shown, 19 individual cells 1208 are provided in the repeating cell structure 1210, with 7 interior hexagonal cells being surrounded by a ring of peripheral hexagonal cells 1208, to form a ring within a ring configuration. The grouping of individual cells 1208 having a hexagonal perimeter shape is bounded by thick walls 1212. Other suitable repeating cell structures including a grouping of individual cells 1208 having a hexagonal perimeter shape wherein the group is bounded by thick walls 1212 may be used. For example, embodiments including a first inner ring of hexagonal cells 1208 and an incomplete outer ring of hexagonal cells 1208 may be used. Other suitable embodiments including arrangements of hexagonal cells 1208 numbering between 7 and 36 may be used.

A first transverse thickness Tk of the thick walls 1112, 1212 may be less than or equal to 0.005 inch (0.127 mm). The second transverse thickness Tt of the thin walls 1114, 1214 may be less than or equal to 0.0025 inch (0.0635 mm), or even less than or equal to 0.002 inch (0.0508 mm). Further, the thin-walled honeycomb bodies 1100, 1200 can comprise a cell density of greater than or equal to 600 cpsi. However, in other embodiments, the cell density may be greater than or equal to 750 cpsi, or even greater than or equal to 900 cpsi. Moreover, combinations of "ultra-thin" walls, e.g., having first transverse thickness Tk of the thick walls 1112, 1212 of less than or equal to 0.005 inch (0.127 mm), and second transverse thickness Tt of the thin walls 1114, 1214 of less than or equal to 0.0025 inch (0.0635 mm), and cell densities of greater than or equal to 600 cpsi, greater than or equal to 750 cpsi, or even greater than or equal to 900 cpsi can be provided.

Some common features of the above-described repeating cell structures 110-1210 can be that each of the individual cells 108, 1108, 1208 therein are bounded on at least two sides by thin walls 114H, 114V, 1114, 1214. However, in some embodiments all sides of some interior ones of the individual cells 108, 1108, 1208 such as at the interior of the repeating cell structures 110-1210 can be bounded by thin walls 114H, 114V, 1114, 1214. Further, in the embodiments described herein, the individual cells 108, 1108, 1208 of the described repeating cell structures 110-1210 can be of equal size in transverse cross section. Although in some embodiments they may be of different size in transverse cross section.

Furthermore, in some embodiments herein, the thin-walled honeycomb bodies 100, 200, 1100, 1200, etc. can have an average wall thickness of the porous walls 102, 1102, 1202 that is less than or equal to 0.0030 inch, less than or equal to 0.0025 inch, or even less than or equal to 0.0020 inch. Average wall thickness is defined herein as the thickness of all the thick walls (112H, 112V, 1112, 1212) multiplied by Lk, plus the thickness of all the thin walls (114H, 114V, 1114, 1214) multiplied by Lt, all divided by the total wall length (Ltot) of all the walls in the honeycomb body, wherein Lk is the length of all the thick walls 112H, 112V, 1112, 1212 and Lt is the length of all the thin walls 114H, 114V, 1114, 1214.

Further, in some embodiments, the thin-walled honeycomb body comprises a thickness difference of Tk−Tt≥0.0025 inch (0.0635 mm), or Tk−Tt≥0.0030 inch (0.0762 mm), or even Tk−Tt≥0.0035 inch (0.0889 mm). In some embodiments, the thickness difference comprises 0.0025 inch (0.0635 mm)≤Tk−Tt≤0.0035 inch (0.0889 mm). Too small of a thickness difference results in low isostatic strength, whereas too large of a thickness difference results in reduced fast light-off and possibly extrusion and quality problems of the extrudate.

In the embodiments described herein, the porous walls 102, 1102, 1202 of the thin-walled honeycomb bodies 100, 200, 1100, 1200, etc. described herein may comprise open, interconnected porosity and the porous walls 102, 1102, 1202 may be made of a porous ceramic material or other suitable porous material that can withstand high temperatures in use, such as those encountered when used in engine exhaust after-treatment applications. For example, the intersecting porous walls 102, 1102, 1202 may comprise a ceramic material, such as cordierite, aluminum titanate, mullite, a combination of cordierite, mullite and aluminum titanate (CMAT), alumina ($Al_2O_3$), silicon carbide (SiC), silicon aluminum oxynitride ($Al_6O_2N_6Si$), zeolite, enstatite, forsterite, corrundum, spinel, sapphirine, periclase, combinations of the afore-mentioned, and the like. Other suitable porous materials may be used, such as fused silica or porous metal.

In the case of ceramics, the porous walls 102, 1102, 1202 may be initially formed as non-porous walls during an extrusion process wherein a suitable plasticized batch mixture of inorganic and organic batch components and a liquid vehicle (e.g., water or deionized water) and possibly extrusion aids are extruded through a honeycomb extrusion die. The green honeycomb bodies produced may then be dried and fired to produce the described honeycomb bodies including porous walls 102, 1102, 1202 as described herein.

As a representative example, the honeycomb body 100 of FIG. 1A (and other embodiments described herein) may comprise a skin 105 on an outer radial periphery of the honeycomb body 100 defining an outer peripheral surface 100S thereof. Such a skin 105 may be applied to the other honeycomb bodies described herein. The skin 105 may be extruded with the body together during the extrusion process or may be an after-applied skin that is applied in later processing after the extrusion process in some embodiments, i.e., applied as ceramic-based skin cement onto an outer periphery (e.g., a machined outer periphery) of a fired ceramic honeycomb. The skin 105 may comprise a skin thickness Ts (FIG. 1A) that can be substantially uniform about the radial periphery of the honeycomb body 100, for example. The skin thickness Ts may be between about 0.1 mm to 100 mm, or even between 0.1 mm to 10 mm, or even between 0.1 mm and 0.005 mm, for example. Other skin thicknesses Ts may be used.

Apparatus and methods for skinning articles, such as honeycomb bodies are described in U.S. Pat. No. 9,132,578, for example. Other suitable skinning methods may be used. In the embodiments described herein in FIGS. 1A-10, the intersecting porous walls 102, 1102, 1202 comprising both thick walls (e.g., thick walls 112H, 112V, 1112, 1212) and thin walls (e.g., thin walls 114H, 114V, 1114, 1214) may intersect with one another and advantageously extend continuously across the honeycomb bodies 100, 200, 1100, 1200 etc. between sections of the skin 105 in both orthogonal directions (vertically (Z-direction) and horizontally (X-direction) as shown). As will be apparent, some configurations (e.g., FIG. 1A-FIG. 10) can have definite benefits in terms of reducing extrusion die cost, as wire EDM, abrasive wheel slotting, or other relatively low-cost manufacturing methods may be used. In these embodiments, the respective slots of the extrusion die extend entirely across the outlet face of the die in a straight line.

In the embodiments described herein in FIGS. 11-12, the intersecting porous walls 1102, 1202 comprising both thick walls 1112, 1212 and thin walls 1114, 1214 may intersect with one another and advantageously extend continuously across the honeycomb bodies 1100, 1200 between sections of the skin (not shown), albeit not in a straight line.

Figure 2:
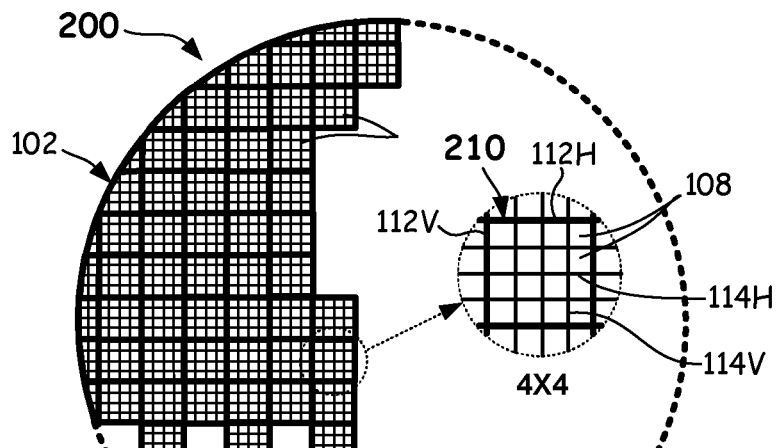
FIG. 2 illustrates a partial inlet end view of a thin-walled honeycomb body comprising a repeating cell structure having a 4×4 R×C configuration (only a portion of the thin-walled honeycomb body shown) according to one or more embodiments.

Each of the described repeating cell structures 110-1210 above may be provided in a honeycomb body, and the outermost cross-sectional shape of the honeycomb body may be of any desired shape, such as a circle (as shown in FIGS. 1A and 2), ellipse, oval, triangular or tri-lobed, racetrack, square, or rectangular (non-square), or other polygonal shape, but the honeycomb body is not limited to these cross-sectional shapes. Other cross-sectional shapes may be used.

In some embodiments, a honeycomb assembly may be produced by adhering together multiple ones of honeycomb bodies (e.g., having a square, rectangular, and/or pie-shaped outer perimeter shape). Each of the honeycomb bodies may comprise multiple ones of any of the repeating cell structures 110-1210, as described herein, repeated therein. Any suitable cement mixture may be used for adhering together the multiple honeycomb bodies. For example, a cement mixture such as is described in WO 2009/017642 may be used. Other suitable cement mixtures may be used. Any suitable outer periphery shape of the honeycomb assembly may be used, such as square, rectangular, circular, triangular or tri-lobed, elliptical, oval, race track, other polygonal shape, and the like. A suitable skin (e.g., skin 105) may be applied around the outer periphery of the honeycomb assembly in some embodiments.

Embodiments of the honeycomb bodies comprising the repeating cell structures 110-1210 described herein may comprise certain microstructural properties, which in combination with the repeating cell structure configuration may provide for a combination of relatively-low pressure drop, as well as fast light-off, and improved isostatic strength.

For example, the open and interconnected porosity (% P) of the porous walls 102, 1102, 1202, after firing, may be % P≤65%, % P≤60%, P %≤55%, P %≤50%, P %≤45%, P %≤40%, % P≤35%, or even % P≤30%. In some embodiments, the open and interconnected porosity of the intersecting porous walls 102, 1102, 1202 may be 20%≤% P≤60%, or even 25%≤% P≤60%, or even 25%≤% P≤55%.

For low-porosity, thin-walled honeycomb bodies the open and interconnected porosity (% P) of the porous walls 102, 1102, 1202, after firing, may be 25%≤% P≤35%. For high-porosity, thin-walled honeycomb bodies, the open and interconnected porosity (% P) of the porous walls 102, 1102, 1202, after firing, may be 45%≤% P≤65%. Other values of % P may be used. Porosity (% P) as recited herein is measured by a mercury porosity measurement method.

The porous walls 102, 1102, 1202, after firing, may comprise a median pore diameter ($D_{50}$) of 1.0 µm≤$D_{50}$≤5.0 µm, or even 1.2 µm≤$D_{50}$≤4.0 µm in some embodiments. The breadth dB of the pore size distribution of the open, interconnected porosity may be dB≤0.60, or even dB≤0.55, or even dB≤0.50, or even dB≤0.45, or even dB≤0.40, or even dB≤0.35, and 0.30≤dB≤0.60, wherein dB=(($D_{90}$−$D_{10}$)/$D_{50}$), wherein $D_{90}$ is an equivalent spherical diameter in the pore size distribution of the porous walls 102 where 90% of the pores have an equal or smaller diameter and 10% have a larger diameter, and $D_{10}$ is an equivalent spherical diameter in the pore size distribution where 10% of the pores have an equal or smaller diameter, and 90% have a larger diameter. The median pore diameter ($D_{50}$) and breadth dB of the pore size distribution may be measured by mercury porosimetry, for example.

In low-porosity, thin-walled honeycomb bodies, the porous walls 102, 1102, 1202, after firing, may comprise a median pore diameter ($D_{50}$) of 1.0 µm≤$D_{50}$≤2.0 µm in some embodiments, and breadth dB of the pore size distribution of the open, interconnected porosity may be 0.30≤dB≤0.40. For high-porosity, thin-walled honeycomb bodies, the open and interconnected porosity (% P) of the porous walls 102, 1102, 1202, after firing, may comprise a median pore diameter ($D_{50}$) of 3.0 µm≤$D_{50}$≤5.0 µm in some embodiments, and breadth dB of the pore size distribution of the open, interconnected porosity may be 0.60≤dB≤0.40.

The above described % P, dB, $D_{50}$, and cell density may be combined in any combination with each other and with the structures of the repeating cell structures 110-1210 described herein. For example, some repeating cell structures in accordance with embodiments of the disclosure can have a cell structure with an R×C configuration and a rectangular outer periphery, wherein R is a number of rows of individual cells 108 and C is a number of columns of individual cells 108 in the particular repeating cell structure 110-1010. For example, R can be between 3 and 6, and C can be between 3 and 6.

Other embodiments can have a cell structure with a configuration including a ring of individual cells 908 with a hexagonal cross section arranged at an outer periphery (See. FIGS. 11-12). Other repeating cell structures including individual cells (like cells 1108, 1208) with a hexagonal cross section (other than the 7 and 19 cells shown) may have a total of 9, 10, 12, and 13 individual hexagonal cells in the repeating cell structure, for example.

Particularly effective examples of honeycomb bodies can include a configuration of repeating cell structure 110-1210 having a thick wall thickness Tk of the thick walls 112H, 112V, 1112, 1212 of between 0.003 inch (0.076 mm) and 0.005 inch (0.127 mm), a thin wall thickness Tt of the thin walls 114H, 114V, 1114, 1214 of between 0.0015 inch (0.038 mm) and 0.0025 inch (0.0635 mm), an open porosity (% P) of the intersecting porous walls 102, 1102, 1202 of 20%≤P %≤60%, a median pore size ($D_{50}$) of the porous walls 102, 1102, 1202 of 1.0 microns≤MPS≤10 microns, or even 1.0 microns≤MPS≤5 microns, and a number of individual cells 108, 1108, 1208 in the repeating cell structure is between 7 and 36. Other embodiments can have a number of individual cells 108, 1108, 1208 in the repeating cell structure of between 7 and 30, 7 and 25, or even 7 and 20 individual cells Some example embodiments of the thin-walled honeycomb body (e.g., thin-walled honeycomb body 200 may comprise a plurality of repeating cell structures 210 as shown in FIG. 2 (R×C of 4×4) and may further have a combined structural configuration of 900/4/1.5/4×4 corresponding to cell density (cpsi)/Tk/Tt/R×C. Further example embodiments of the thin-walled honeycomb body 200 may comprise a repeating cell structure 750/4/1.5/4×4 configuration, wherein these values correspond to cell density (cpsi)/Tk/Tt/R×C. Other example embodiments of the thin-walled honeycomb body (e.g., thin-walled honeycomb body 200 may comprise a repeating cell structure configuration as shown in FIG. 2 (R×C of 4×4) and may further have a combined structural configuration of 750/5/2.5/4×4 corresponding to cell density (cpsi)/Tk/Tt/R×C.

Figure 13:
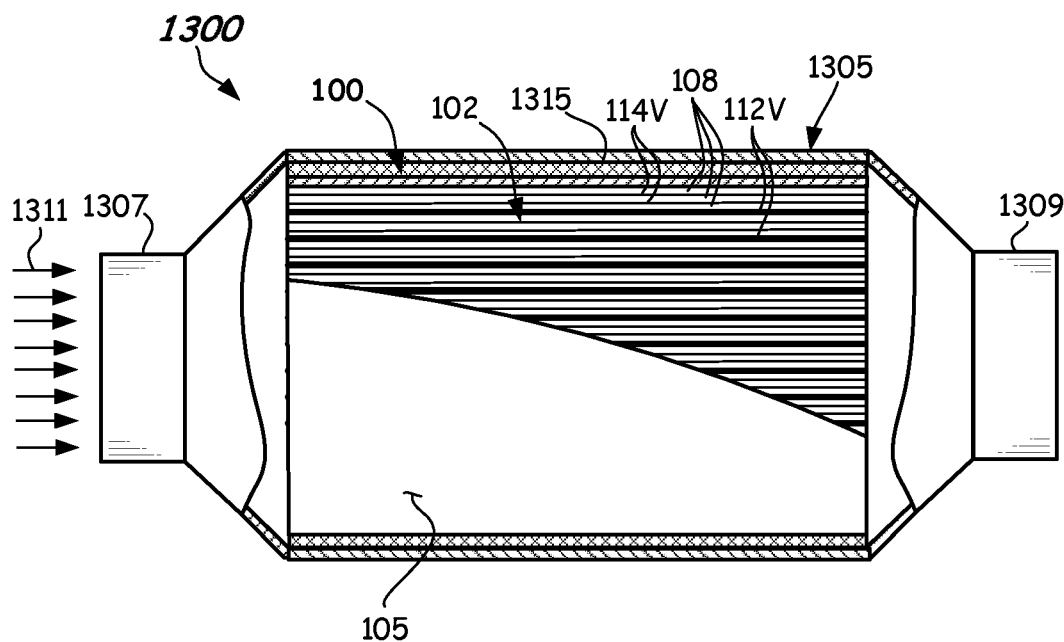
FIG. 13 illustrates a partially cross-sectioned side view of catalytic converter containing a thin-walled honeycomb body comprising thin walls and thick walls according to one or more embodiments.

Referring now to FIG. 13, a catalytic converter 1300 including the honeycomb body 100 of FIGS. 1A-1B is shown. Optionally, honeycomb body 200 or honeycomb bodies including any one of repeating cell structures 310-1210 may be used. In the depicted embodiment, the honeycomb body 100 is received inside of a can 1305, such as a metal housing or other rigid confining structure. Can 1305 may comprise a first end cap including an inlet 1307 configured to receive engine exhaust flow 1311 therein, and a second end cap including an outlet 1309 configured to exhaust a gas flow, wherein a percentage of an undesirable species (e.g., NOx, CO, HC, or SOx) in the engine exhaust flow 1311 has been reduced by passing through the cells 108 of the honeycomb body 100 and interacting with catalyst provided on and/or in the porous walls 102 formed by the thick walls 112H, 112V and the thin walls 114H, 114V therein. The skin 105 of the honeycomb body 100 may have a member 1315 in contact therewith, such as a high-temperature insulation material, to cushion the honeycomb body 100 from shock and stress. Any suitable construction of the member 1315 may be used, such as one-piece construction, or two or more layer construction. The honeycomb body 100 and member 1315 may be received in the can 1305 by any suitable means, such as by funneling into the central body and then one or more of the first and second end caps may be secured (e.g., welded) onto the central body for forming the inlet 1307 and the outlet 1309. Other, two-piece construction or clam-shell construction of the can 1305 can be optionally used.

Figure 14:
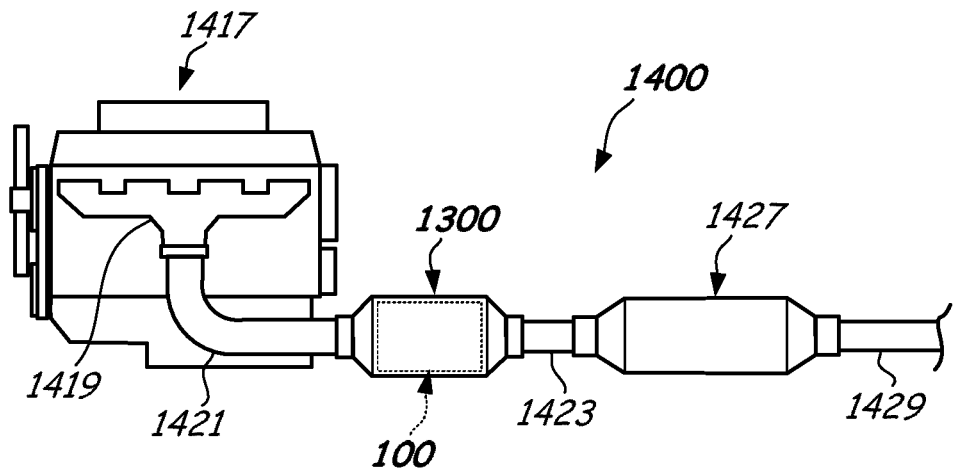
FIG. 14 illustrates a schematic side view of an exhaust system of an internal combustion engine comprising a catalytic converter containing a honeycomb body comprising thin walls and thick walls according to one or more embodiments.

FIG. 14 illustrates an exhaust system 1400 coupled to an engine 1417 (e.g., a gasoline engine or diesel internal combustion engine). The exhaust system 1400 may comprise a manifold 1419 configured for coupling to the exhaust ports of the engine 1417, a first collection tube 1421 configured to couple between the manifold 1419 and the catalytic converter 1300 containing the thin-walled honeycomb body 100 (shown dotted) therein. Coupling may be by any suitable clamping bracket or other attachment mechanism, such as welding. Furthermore, the first collection tube 1421 may be integral with the manifold 1419. In some embodiments, the catalytic converter 1300 may couple directly to the manifold 1419 without an intervening member. The exhaust system 1400 may further comprise a second collection tube 1423 coupled to the catalytic converter 1300 and to a second exhaust component 1427. The second exhaust component 1427 may be a muffler, another of a same type or different type of catalytic converter, or a particulate filter. A tailpipe 1429 (shown truncated) or other flow conduit may be coupled to the second exhaust component 1427. Other exhaust system components may be included, such as other catalytic converters, particulate filters, oxygen sensors, ports for urea injection, and the like (not shown). In some embodiments, the engine 1417 may comprise one catalytic converter 1300 for each bank (side set of cylinders) of the engine 1417 in which case the second collection tube 1423 may be a Y-tube, or optionally, the first collection tube 1421 may be a Y-tube collecting exhaust flow from each bank and directing the flow to the catalytic converter 1300.

Utilizing the catalytic converter 1300 including the honeycomb body 100 (or optionally, honeycomb body 200 or honeycomb bodies including any one of repeating cell structures 310-1210) according to embodiments described herein may result in fast light-off (FLO) properties in combination with excellent isostatic strength. For example, FLO of a conventional 750/2.8 honeycomb body is about 60 seconds and for a 756/4/1.5/4×4 is about 59 seconds (~1.5% improvement over 750/2.8) and 756/4/1.5/6×6 is 58 seconds (~3.5% improvement over 750/2.8). Also, average isostatic strength for a 750/2.8 is about 32 bars. However, as the wall thickness of a conventional 750/2.8 honeycomb body is lowered to be hypothetically 750/1.5, the average isostatic strength dramatically drops to about 9 bars. However, average isostatic strength is about 12 bars for a 756/4/1.5/4×4 embodiment (about a 25% improvement over the hypothetical 750/1.5). In another example, an average isostatic strength is about 9.6 bars for a 756/4/1.5/6×6 embodiment (about a 7% improvement over the hypothetical 750/1.5). All of the isostatic and FLO numbers provided in this paragraph are based on model predictions.

Moreover, in various embodiments of the honeycomb body 100 described herein have more effective wall surface area, thus advantageously more catalyst may be applied to the walls resulting in more effective oxidation and/or reduction reactions (depending upon the catalysts applied). Furthermore, various embodiments of the honeycomb body 100 described herein exert relatively-lower back pressure in the exhaust system 1400 when loaded with catalyst. This may allow for free exhaust flow and thus substantially minimal power reduction of the engine 1417.

Figure 15A:
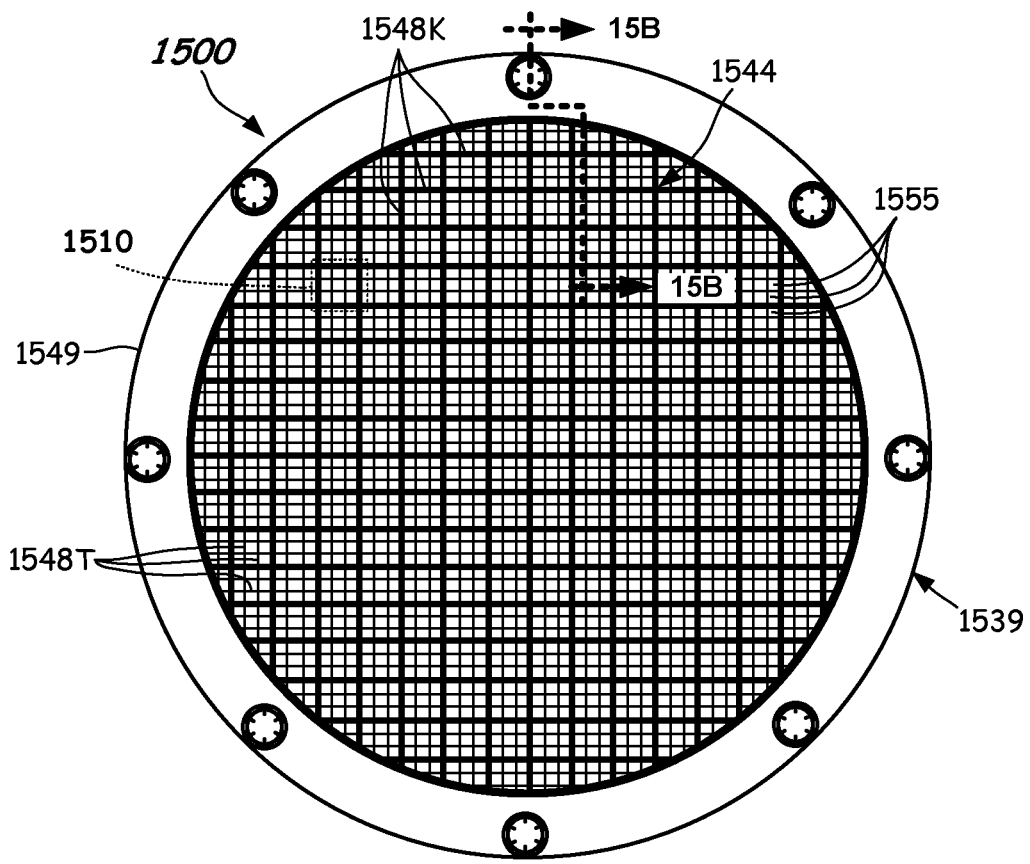
FIG. 15A illustrates a front view of an extrusion die used for manufacture of honeycomb bodies comprising thin walls and thick walls according to one or more embodiments.
Figure 15B:
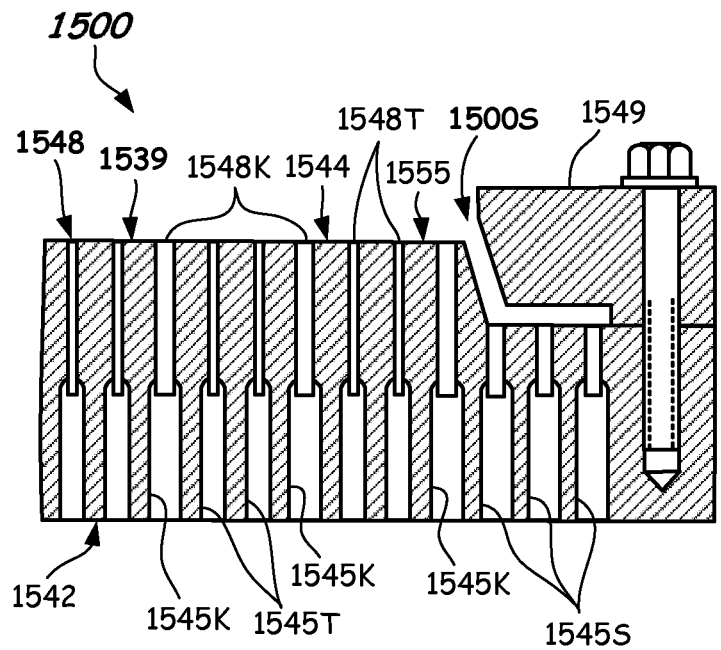
FIG. 15B illustrates a partial cross-sectioned side view of the extrusion die taken along section line 15B-15B of FIG. 15A according to one or more embodiments.
Figure 15C:
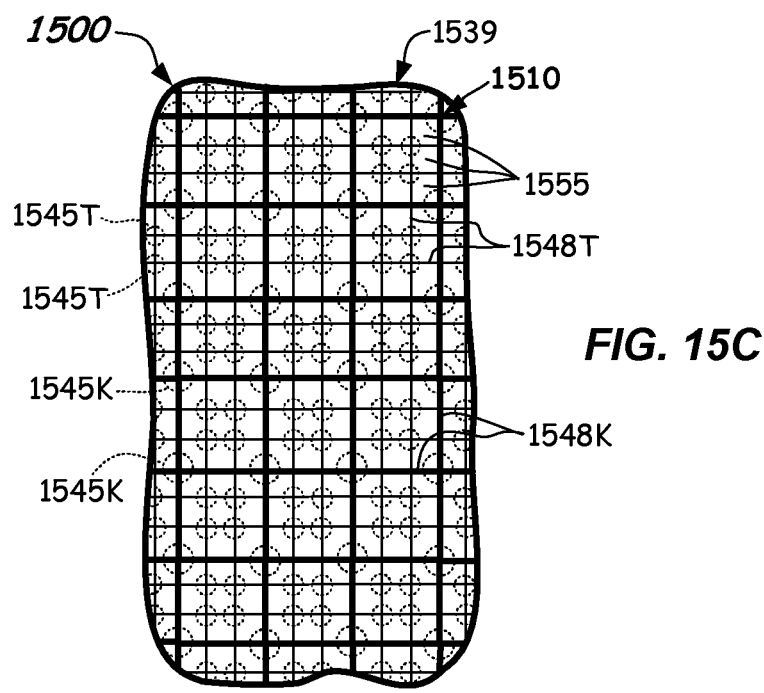
FIG. 15C illustrates a partial front view of an outlet face of an extrusion die of FIG. 15A illustrating example feedhole locations (shown as dotted circles) for thin slots and thick slots according to one or more embodiments.

Referring now to FIGS. 15A-15C, a honeycomb extrusion die 1500 configured to manufacture the honeycomb bodies 100, 200 or optionally honeycomb bodies including any one of repeating cell structures 310-1010 is provided. The honeycomb bodies may be formed by extrusion of a plasticized batch through the honeycomb extrusion die 1500 to produce a wet honeycomb body, as described in, for example, U.S. Pat. Nos. 3,885,977, 5,332,703, 6,391,813, 7,017,278, 8,974,724, WO2014/046912, and WO2008/066765. The wet honeycomb body may then be dried to produce a green honeycomb body, as described in, for example, U.S. Pat. Nos. 9,038,284, 9,335,093, 7,596,885, and 6,259,078. The green honeycomb body may then be fired to form any desired one of the honeycomb bodies 100, 200 or honeycomb bodies including repeating cell structures 310-1010, as described in U.S. Pat. Nos. 9,452,578, 9,446,560, 9,005,517, 8,974,724, 6,541,407, or U.S. Pat. No. 6,221,308. Other suitable forming, drying, and/or firing methods may be used.

The honeycomb extrusion die 1500 can comprise (i) a die body 1539, such as a metal disc, (ii) a die inlet face 1542 configured to receive the plasticized batch composition from an extruder, and (iii) a die outlet face 1544 opposite from the die inlet face 1542 and configured to expel plasticized batch in the form of a wet thin-walled honeycomb body. The honeycomb extrusion die 1500 may be coupled to an extruder (such as a twin-screw extruder or other extruder type—not shown) that receives the batch composition and forces the batch composition under pressure through the honeycomb extrusion die 1500.

The honeycomb extrusion die 1500 may comprise a plurality of thin feedholes 1545T and a plurality of thick feedholes 1545K (a few labeled) extending from the die inlet face 1542 into the die body 1539. The plurality of thin feedholes 1545T and a plurality of thick feedholes 1545K intersect with an array of thin slots 1548T and thick slots 1548K (a few labeled) extending into the die body 1539 from the die outlet face 1544. The plurality of thick slots 1548K have a first slot thickness Sk and the plurality of thin slots 1548T have a second slot thickness St, measured transversely across the respective slots. The first slot thickness Sk, corresponding to the first transverse thickness Tk, is thicker than the second slot thickness St, corresponding to the second transverse thickness Tt. The first slot thickness Sk and the second slot thickness St may be selected based on the total shrinkage of the batch composition that is used (e.g., shrinkage from extrusion through firing) so that the fired honeycomb body has a first transverse thickness Tk of the thick walls of less than or equal to 0.005 inch (0.127 mm) and a second transverse thickness Tt of the thin walls of less than or equal to 0.005 inch (0.0635 mm), or even less than or equal to 0.002 inch (0.0508 mm).

For example, for a nominal extrude-to-fire shrinkage of 12%, the first slot thickness Sk may be selected to be less than or equal to 0.0056 inch (0.142 mm) and the second slot thickness St may be selected to be less than or equal to 0.0028 inch (0.0711 mm). In particular, first slot thickness Sk and the second slot thickness St may be coated thicknesses (i.e., thicknesses after applying a wear coating), wherein the first slot thickness Sk is greater than the second slot thickness St.

The plurality of thick feedholes 1545K connect with, and can be configured to feed batch composition to, the thick slots 1548K and the plurality of thin feedholes 1545T connect with, and are configured to feed batch composition to, the thin slots 1548T. The array of slots comprising thick slots 1548K and thin slots 1548T (a few labeled) intersect with one another and themselves as shown in FIG. 15A. Thick slots 1548K can extend in a straight line entirely across the die outlet face 1544. Likewise, the thin slots 1548T may also extend in a straight line fully across the die outlet face 1544.

The intersecting array of thick and thin slots 1548K, 1548T form an array of die pins 1555 (a few labeled) that are arranged in a plurality of die pin repeating structures 1510 that are repeated across the die outlet face 1544. The plurality of die pin repeating structures 1510 may be arranged, as shown, with each of the die pin repeating structures 1510 being bounded at a periphery by the thick slots 1548K. The thin slots 1548T subdivide the die pin repeating structure 1510 into an R×C die pin configuration, wherein R and C are integers and may vary between 3 and 6 for configurations with rectangular outer periphery of the die pin repeating structure 1310. The depicted embodiment of FIG. 15A-15C is a 3×3 configuration, but other R×C configurations may be used. Example pin repeating structures 1510 of the extrusion die 1500 may comprise configurations having R×C of 3×3, 3×4, 3×5, 3×6, 4×4, 4×5, 4×6, 5×5, 5×6, or 6×6, for example. The number of die pins in the die pin repeating structure 1510 can be between 7 and 36 in the above-described R×C configuration.

In the depicted embodiment, the thick slots 1548K and thin slots 1548T can be formed by abrasive wheel slotting or by a wire electron discharge machining (EDM) process, for example. Other suitable die manufacturing methods may be used. Each of the array of die pins 1555 may be rectangular (e.g., square or non-square rectangular) in transverse cross-sectional shape. The honeycomb extrusion die 1500 may comprise a skin-forming portion 1500S including a skin-forming mask 1549 (e.g., a ring-shaped article) that interfaces with batch from the skin forming feedholes 1545S and recessed skin-forming region outboard of the die outlet face 1544 to form an extruded skin on the wet green honeycomb body formed during the extrusion method.

FIG. 15C illustrates a partial outlet face view of an embodiment of honeycomb extrusion die 1500, which comprises a feedhole pattern of thick feedholes 1545K and interspersed thin feedholes 1545T shown as dotted circles, and thin slots 1548T and thick slots 1548T shown as solid lines. In the depicted embodiment, the larger diameter feedholes can be thick feedholes 1545K and can be included at every intersection of the thick slots 1548K. Smaller diameter feedholes can be feedholes 1545T and can be provided at the intersection of the thin slots 1548T. Additional feedholes may be added to ensure good knit and ample supply of batch composition to the thin slots 1548T and thick slots 1548K. Moreover, the size of the feedholes 1545T, 1545K may be adjusted to adjust and balance batch flow. Other feedhole configurations may be used in embodiments of the honeycomb extrusion die 1500. Thin slots 1548T and thick slots 1548K may comprise divots and/or plenums formed therein.

In another embodiment shown in partial view in FIG. 16, an extrusion die 1600 configured for making a hexagonal cell honeycomb body with thin and thick slots is shown. The extrusion die 1600 comprises a die body 1639 including an array of thin slots 1648T and thick slots 1648K intersecting with one another and forming an array of die pins 1655, wherein each die pin 1655 (that is a complete die pin) comprises a hexagonal shape in transverse cross section. Extrusion die 1600 is configured to be able to form honeycomb body 1100 having the repeating cell structure 1110 shown in FIGS. 11A-11B. The die body 1639 may comprise any suitable feedhole pattern wherein the feedholes 1645 (shown as dotted circles), in the depicted embodiment, can be included at every intersection of the array of thick slots 1648K and thin slots 1648T. In this embodiment, the array of thick slots 1648K and thin slots 1648T may be formed by an electron discharge machining (EDM) process, wherein one or more formed electrodes is plunged into the die body 1639 to machine the array of thick slots 1648K and thin slots 1648T. The remainder of the extrusion die 1600 may be the same as described above, i.e., may comprise a mask and skin forming region for forming an extruded skin 105.

The embodiment of honeycomb body 1200 shown in FIG. 12 may be manufactured using an extrusion die, like extrusion die 1600, except with the thin slots and thick slots being arranged to form the configuration that is shown in FIG. 12. In each of the embodiments of extrusion dies for forming hexagonal cells, the sizes of each of the feedholes (e.g., feedholes 1645—shown dotted) may be adjusted to provide an effective amount of batch composition to each intersection to promote knitting of the formed walls and good wall shape.

In some embodiments, the repeating cell structures 110-1210 described herein can be distributed and repeated across the entire honeycomb body, excluding only incomplete repeating cell structures that intersect with the skin 105 and may thus be truncated at that skin location. However, in some embodiments, different types of repeating cell structures may be co-mingled across the honeycomb body. Moreover, combinations of repeating cell structures including thin and thick walls as described herein and conventional honeycomb structures may be co-mingled. Further, the thickness of the thick walls may get slightly thicker near the outer periphery of the honeycomb body. Likewise, a thickness of the thin walls can be slightly thicker at the outer periphery of the honeycomb body.

Referring now to FIG. 17, a method of forming a thin-walled honeycomb body (e.g., thin-walled honeycomb body 100, 200, 1100, 1200 or any thin-walled honeycomb body including the repeating cell structures 110-1210) will now be described. The method 1700 comprises, in step 1702, providing a honeycomb extrusion die (e.g., honeycomb extrusion die 1500, 1600, or the like) comprising an outlet face forming a plurality of repeating pin structures (e.g., repeating pin structure 1510, 1610) defining intersecting thick slots (e.g., thick slots 1548K, 1648K) and thin slots (e.g., thick slots 1548T, 1648T). Each repeating pin structure is bounded on a periphery by the thick slots (e.g., thick slots 1548K, 1648K) of a first slot thickness Sk that are less than or equal to 0.0056 inch (0.142 mm) and the thin slots of a second slot thickness St that are less than or equal to 0.0028 inch (0.0711) that subdivide the repeating pin structure into between 7 and 36 individual die pins (e.g., individual die pins 1555, 1655).

The method 1700 further comprises, in step 1704, extruding a ceramic-forming mixture through the honeycomb extrusion die to produce the thin-walled honeycomb body. The produced thin-walled honeycomb body comprises a plurality of repeating cell structures comprising intersecting thick walls (e.g., thick walls 112H, 112V, 1112, 1212) and thin walls (e.g., thin walls 114H, 114V, 1114, 1214). Various configurations of the repeating cell structures can have between 7 and 36 individual cells (e.g., individual cells 108, 1108, 1208) therein, or even between 7 and 30 (e.g., individual cells 108, 1108, 1208) therein.

The foregoing description discloses numerous example embodiments of the disclosure. Modifications of the above-disclosed thin-walled honeycomb bodies, extrusion dies, and methods that fall within the scope of the disclosure will be readily apparent. For example, any combination of the parameters disclosed herein with respect to one embodiment, may be applied to other honeycomb body embodiments disclosed herein. Accordingly, while the present disclosure includes certain example embodiments, it should be understood that other embodiments may fall within the scope of the disclosure, as defined by the claims.

What is claimed is:

1. A thin-walled honeycomb body, comprising:
a plurality of cells provided by a matrix of intersecting porous walls forming a plurality of repeating cell structures, wherein (i) each repeating cell structure comprises thick walls of a first transverse thickness (Tk) and thin walls of a second transverse thickness (Tt), (ii) each repeating cell structure is subdivided into between 7 and 36 individual cells by thin walls, (iii) each repeating cell structure is bound on a periphery by thick walls, (iv) the thin walls interconnect with the thick walls and with each other, (v) the first transverse thickness (Tk) of the thick walls is less than or equal to 0.005 inch (0.127 mm), and (vi) the second transverse thickness (Tt) of the thin walls is less than or equal to 0.0025 inch (0.0635 mm) and less than the first transverse thickness (Tk),
wherein, 0.0025 inch (0.0635 mm)≤Tk−Tt≤0.0035 inch (0.0889 mm).

2. The thin-walled honeycomb body of claim 1, wherein the first transverse thickness (Tk) of the thick walls is less than or equal to 0.004 inch (0.102 mm).

3. The thin-walled honeycomb body of claim 1, wherein the second transverse thickness (Tt) of the thin walls is less than or equal to 0.002 inch (0.0508 mm).

4. The thin-walled honeycomb body of claim 1, wherein the second transverse thickness (Tt) of the thin walls is less than or equal to 0.0015 inch (0.038 mm).

5. The thin-walled honeycomb body of claim 1, comprising a cell density of greater than or equal to 600 cpsi.

6. The thin-walled honeycomb body of claim 1,
wherein each repeating cell structure comprises an R×C configuration, of 3×3, 3×4, 3×5, 3×6, 4×4, 4×5, 4×6, 5×5, 5×6, or 6×6, and
wherein R is a number of rows and C is a number of columns of the individual cells in each repeating cell structure.

7. The thin-walled honeycomb body of claim 1, comprising a cell density of greater than or equal to 900 cpsi, the first transverse thickness (Tk) of the thick walls is less than or equal to 0.004 inch (0.102 mm), and the second transverse thickness (Tt) of the thin walls is less than or equal to 0.0015 inch (0.0381 mm).

8. The thin-walled honeycomb body of claim 1, wherein each repeating cell structure has a 4×4 configuration and each of the individual cells in the repeating cell structure has a rectangular perimeter shape in transverse cross-section.

9. The thin-walled honeycomb body of claim 1, wherein each repeating cell structure has a 5×5 configuration and each of the individual cells in the repeating cell structure has a rectangular perimeter shape in transverse cross-section.

10. The thin-walled honeycomb body of claim 1, wherein each repeating cell structure has a 6×6 configuration and each of the individual cells in the repeating cell structure has a rectangular perimeter shape in transverse cross-section.

11. The honeycomb body of claim 1, wherein the periphery of each repeating cell structure is rectangular in transverse cross-section.

12. The thin-walled honeycomb body of claim 1, wherein the individual cells of each repeating cell structure have a hexagonal perimeter shape in transverse cross-section.

13. The thin-walled honeycomb body of claim 1, comprising an average wall thickness of less than or equal to 0.003 inch (0.0762 mm).

14. The thin-walled honeycomb body of claim 1, comprising an average wall thickness of less than or equal to 0.0020 inch (0.0508 mm).

15. The thin-walled honeycomb body of claim 1, wherein each repeating cell structure comprises an R×C configuration, wherein R is a number of rows and C is a number of columns of the individual cells in each repeating cell structure.

16. The thin-walled honeycomb body of claim 1, wherein each repeating cell structure comprises a cell structure with an R×C configuration, wherein R is a number of rows and C is a number of columns of individual cells in the repeating cell structure, and wherein R is between 3 and 6, and C is between 3 and 6.

17. The thin-walled honeycomb body of claim 1, wherein each repeating cell structure comprises a ring of 7 individual cells of hexagonal perimeter shape that are collectively bounded by thick walls and surround 1 cell of hexagonal perimeter shape bound by thin walls.

18. The thin-walled honeycomb body of claim 1, wherein the porous walls comprise a ceramic material chosen from the group consisting of cordierite, aluminum titanate, mullite, a combination of cordierite, mullite and aluminum titanate (CMAT), alumina (Al2O3), silicon carbide (SiC), silicon aluminum oxynitride (Al6O2N6Si), zeolite, enstatite, forsterite, corundum, spinel, sapphirine, and periclase.

19. The thin-walled honeycomb body of claim 1, wherein the porous walls comprise an open and interconnected porosity (P %) of 20%≤% P≤60%.

20. A method of manufacturing a thin-walled honeycomb body, comprising:
providing a honeycomb extrusion die comprising an outlet face forming a plurality of repeating pin structures defining intersecting thick slots of a first slot thickness (Sk) and thin slots of a second slot thickness (St), wherein (i) each repeating pin structure is bounded on a periphery by the thick slots, (ii) each repeating pin structure is subdivided into between 7 and 36 individual pins by the thin slots, and (iii) the first slot thickness (Sk) is less than or equal to 0.0056 inch (0.142 mm) and the second slot thickness (St) is less than or equal to 0.0028 inch (0.0711 mm) provided that Sk>St;

extruding a ceramic-forming material through the honeycomb extrusion die to produce the thin-walled honeycomb body; and firing the green honeycomb body to produce the thin-walled honeycomb body having a first transverse thickness (Tk) of thick walls less than or equal to 0.005 inch (0.127 mm) and a second transverse thickness (Tt) of thin walls less than or equal to 0.0025 inch (0.0635 mm), wherein the thick walls are thicker than the thin walls, wherein, 0.0025 inch (0.0635 mm)≤Tk−Tt≤0.0035 inch (0.0889 mm).

* * * * *